United States Patent
Hara et al.

(10) Patent No.: US 7,706,094 B2
(45) Date of Patent: Apr. 27, 2010

(54) STORAGE DEVICE AND SERVO INFORMATION WRITING METHOD

(75) Inventors: Takeshi Hara, Kawasaki (JP);
Yoshifumi Obara, Higashine (JP);
Yukio Abe, Kawasaki (JP); Shigenori Yanagi, Kawasaki (JP); Mitsuo Kamimura, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 2 days.

(21) Appl. No.: 12/121,101

(22) Filed: May 15, 2008

(65) Prior Publication Data

US 2009/0059415 A1 Mar. 5, 2009

(30) Foreign Application Priority Data

Aug. 31, 2007 (JP) .............................. 2007-227007
Nov. 7, 2007 (JP) .............................. 2007-290116

(51) Int. Cl.
*G11B 21/02* (2006.01)
*G11B 5/596* (2006.01)
*G11B 20/20* (2006.01)
*G11B 5/09* (2006.01)

(52) U.S. Cl. .................... 360/75; 360/78.08; 360/78.04; 360/76; 360/48

(58) Field of Classification Search ........................ None
See application file for complete search history.

(56) References Cited

U.S. PATENT DOCUMENTS

| | | | |
|---|---|---|---|
| 5,311,379 A | 5/1994 | Shinohara et al. | |
| 7,126,772 B2 | 10/2006 | Saikawa et al. | |
| 7,173,785 B2 | 2/2007 | Saikawa et al. | |
| 7,453,661 B1 * | 11/2008 | Jang et al. | 360/75 |
| 7,466,509 B1 * | 12/2008 | Chen et al. | 360/75 |
| 7,570,448 B2 * | 8/2009 | Yamagishi | 360/75 |
| 2004/0061967 A1 * | 4/2004 | Lee et al. | 360/75 |
| 2005/0264917 A1 * | 12/2005 | Yano et al. | 360/75 |
| 2007/0247738 A1 | 10/2007 | Yamagishi | |
| 2007/0253095 A1 * | 11/2007 | Washizu et al. | 360/77.08 |
| 2008/0002277 A1 * | 1/2008 | Sacks et al. | 360/75 |

FOREIGN PATENT DOCUMENTS

| | | |
|---|---|---|
| JP | B2 2645182 | 8/1992 |
| JP | A 2001-312808 | 11/2001 |
| JP | 2004-017384 | 1/2004 |
| JP | 2004-027392 | 1/2004 |
| JP | A 2004-30778 | 1/2004 |

* cited by examiner

*Primary Examiner*—Andrew L Sniezek
(74) *Attorney, Agent, or Firm*—Greer, Burns & Crain, Ltd.

(57) ABSTRACT

A storage device receives and holds a storage medium that is subjected to first servo writing processing for writing servo information, a Gray code of which is offset, from an inner cylinder or an outer cylinder to a predetermined cylinder and, after the first servo writing processing, subjected to second servo writing processing for writing servo information from an opposite direction to the predetermined cylinder and in which Gray codes are written to be offset not to overlap in the first or second servo writing processing and the pieces of servo information having different mark patterns are written in the first servo writing processing and the second servo writing processing. The storage device acquires cylinder information and mark patterns from the servo information written in the held storage medium and controls a position of a head based on the acquired cylinder information and mark patterns.

11 Claims, 11 Drawing Sheets

STORAGE DEVICE AND SERVO INFORMATION WRITING METHOD

BACKGROUND OF THE INVENTION

1. Field of the Invention

The present invention relates to a storage device that reads servo information, which is written in an inserted and held storage medium, with a head and controls a position of the head using the read servo information and a servo information writing method.

2. Description of the Related Art

Conventionally, recording density of storage media such as a magnetic disk, a magneto-optical disk, and an optical disk has been remarkably improved. This makes it possible to realize a reduction in size of a storage device and an increase in a recording capacity. Convenience of the storage device is improving.

In such storage media with the improved recording density, to accurately position a head on a target track, servo information such as a track number and a servo pattern (a servo mark) for demodulating a relative position of the head with respect to a track center is written by a servo track writer (STW). The STW writes the servo information from one direction on an outer side or an inner side of a storage medium. A control device such as a magnetic disk device performs, using the servo information, automatic control of a head that reads data from and writes data in the storage medium (see Japanese Patent No. 2645182).

In the writing of the servo information by the STW, deterioration in a quality of servo written in the storage medium due to erase called a side fringe occurs. Problems such as a servo mark mistake and misdetection of a Gray code during reading of the servo information by the head occur. The side fringe is caused by magnetic field leakage (write spread) of a write head that writes the servo information in the storage medium. As shown in FIG. 11, the side fringe is closely related to a yaw angle and a feeding direction of the STW. Specifically, as shown in FIGS. 12A to 12C, when the write head writes the servo information in an outer direction, the influence of the side fringe is large on the outer side. When the write head writes the servo information in an inner direction, the influence of the side fringe is large on the inner side. Therefore, an erase section enlarges and the servo quality is substantially deteriorated. In recent years, amid a further increase in track per inch (TPI), deterioration in an error rate of the servo information and deterioration in a position quality of the head due to the deterioration in the servo quality are becoming innegligible. FIG. 11 is a diagram of a relation between the yaw angle and the feeding direction of the STW. FIGS. 12A to 12C are diagrams for explaining the erase portions in the feeding direction of the STW.

As a method of preventing the deterioration in an error rate, the deterioration in a position quality, and the like due to the deterioration in the servo quality, a bidirectional STW that writes, on the outer side, the servo information while feeding an STW head to the inner side and writes, on the inner side, the servo information while feeding the STW head to the outer side is used. When the bidirectional STW is used, a boundary between the servo information written from the outer side and the servo information written from the inner side is present. This boundary shifts in a time direction and a radial direction because of a change in an environment or the like in writing the servo information. The shift causes nondetection or misdetection of servo. To use a storage medium in which the servo information is written by using the bidirectional STW, it is necessary to accurately read out the servo information written in this boundary (a cylinder as the boundary: a boundary cylinder).

However, when the storage medium in which the servo information is written by the bidirectional STW of the conventional technology described above is used, the boundary of the servo information written from both the directions is separated into two boundaries by a change in an environment or the like in writing the servo information. In other words, a boundary cannot be formed in a Gray code as intended and a position of the head for reading out or writing data cannot be correctly controlled.

SUMMARY

It is an object of the present invention to at least partially solve the problems in the conventional technology.

According to an aspect of the present invention, a storage device includes a storage medium that is subjected to first servo writing processing for writing servo information from an inner cylinder or an outer cylinder to a predetermined cylinder and, after the first servo writing processing, subjected to second servo writing processing for writing servo information from an opposite direction to the predetermined cylinder and in which Gray codes are written to be offset not to overlap in the first or second servo writing processing and the pieces of servo information are written to overlap each other near the predetermined cylinder in the first servo writing processing and the second servo writing processing. The storage device also includes a head that reads out the information written in the storage medium; and a head-position control unit that reads out the servo information written in the storage medium using the head and controls a position of the head using the read-out servo information.

According to another aspect of the present invention, a servo information writing method includes performing, on a storage medium, first servo writing processing for writing servo information from an inner cylinder or an outer cylinder to a predetermined cylinder; after the first servo writing processing, performing, on the storage medium, second servo writing processing for writing servo information from an opposite direction to the predetermined cylinder; offsetting Gray codes not to overlap in the first or second servo writing processing; and writing the pieces of servo information in the storage medium to overlap each other near the predetermined cylinder in the first servo writing processing and the second servo writing processing.

According to still another aspect of the present invention, a servo information writing device includes a first servo writing unit that writes servo information, a Gray code of which is offset, from any one of an inner cylinder and an outer cylinder to a predetermined cylinder; and a second servo writing unit that writes servo information in a storage medium, in which the servo information is written by the first servo writing unit, from a cylinder opposite to the cylinder, from which the first servo writing unit writes the servo information, to the predetermined cylinder.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

First, main terms used in the embodiments are explained. A "storage device" is a device mainly including a disk that records data, a head that reads data from and writes data in the disk, a voice coil motor (VCM) that moves the head to a predetermined position, and a control circuit that controls the disk, the head, and the voice coil motor. In the storage device, the disk is rotated at a fixed number of revolutions by a spindle motor (SPM) and the head reads data from and writes data in the disk while floating over the disk.

Data reading is realized when the head is positioned in the predetermined position of the disk and reads data recorded in the predetermined position. Data writing is realized when the head is positioned in the predetermined position of the disk and writes data in the predetermined position. Such positioning of the head is controlled by a micro control unit (MCU) of the storage device.

The "MCU" that performs position control for the head reads "service control data" stored in the disk other than "user data", which is data used for processing in a host computer, and performs position control. In the servo control data, information on a position in the disk and the like are recorded. Therefore, when "servo information (servo control data)" read by the head is transmitted to the MCU, the MCU calculates a present position of the head. The MCU performs filter calculation based on the present position of the head and controls the VCM using a control value obtained by the filter calculation. The VCM is a driving unit that moves the head to the predetermined position as described above. Therefore, when the VCM is controlled, positioning of the head is controlled.

In this way, the MCU reads the servo information stored in the disk and performs the filter calculation to perform the position control for the head. Therefore, accurate reading of the servo information is important for positioning control for the head in the storage device. If the servo information is not accurately written in the disk, in the position control for the head, the servo information read out by the MCU lacks accuracy. Therefore, it is also important to accurately write the servo information in the disk.

Figure 1:
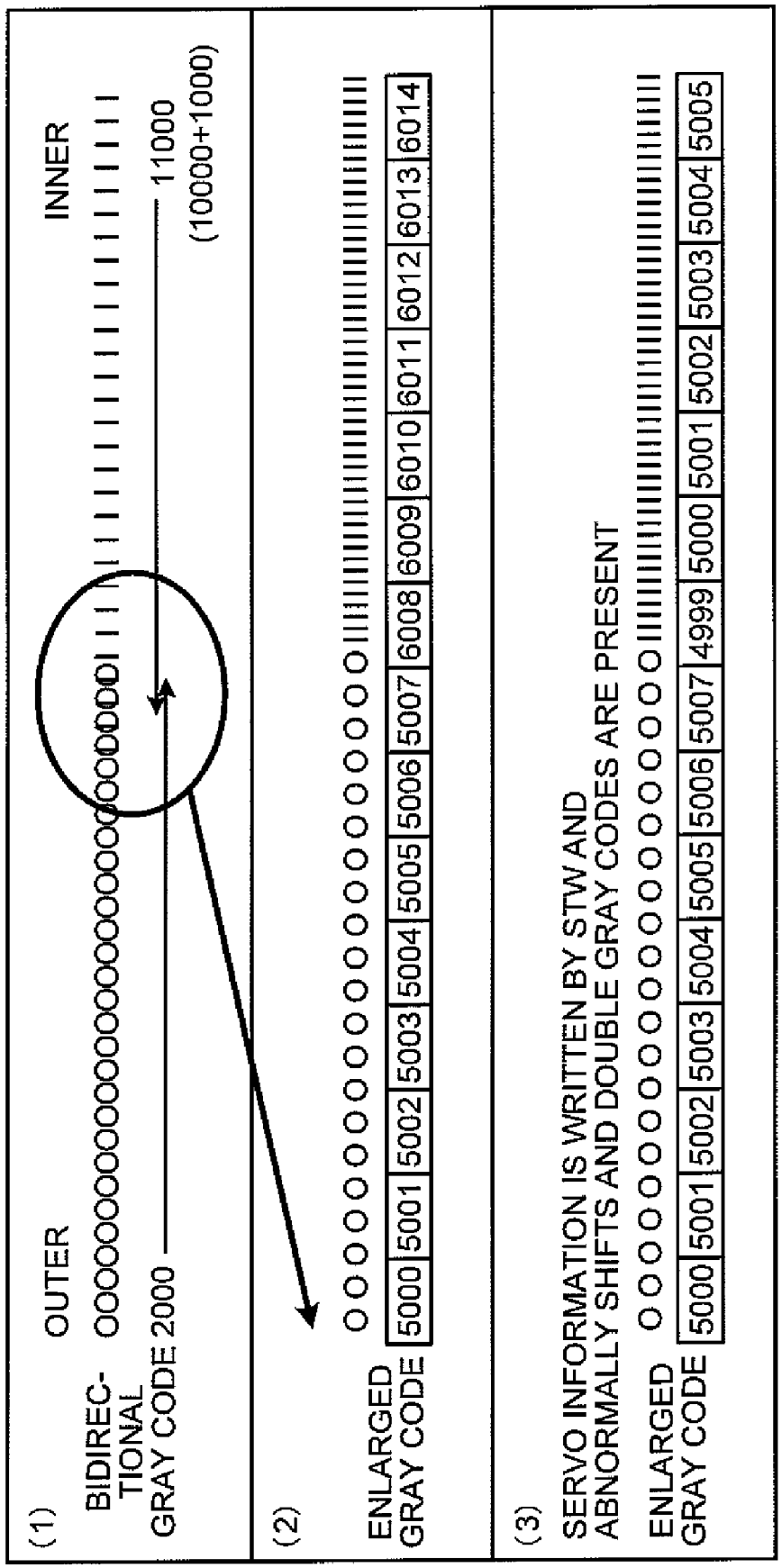
FIG. 1 is a diagram for explaining an overview and a characteristic of a storage device according to a first embodiment of the present invention.

FIG. 1 is a diagram for explaining an overview and a characteristic of the storage device according to a first embodiment of the present invention.

As an overview of the storage device, the storage device reads servo information, which is written in an inserted and held storage medium, with a head and controls a position of the head using the read servo information. In particular, the storage device is mainly characterized in that, even in a storage medium in which servo information is written by using a bidirectional STW, it is possible to correctly control a position of the head without deteriorating a servo quality.

Specifically, the storage device receives and holds a storage medium that is subjected to first servo writing processing for writing servo information, a Gray code of which is offset, from an inner cylinder to a predetermined cylinder on an outer side and, after the first servo writing processing, subjected to second servo writing processing for writing servo information from an outer cylinder to a predetermined cylinder on an inner side and in which the pieces of servo information having different mark patterns are written in the first servo writing processing and the second servo writing processing, respectively. The storage device acquires cylinder information and the mark patterns from the servo information written in the held storage medium and controls a position of the head based on the acquired cylinder information and mark patterns.

An apparatus (a method) that writes servo information from both directions on the inner side and the outer side in this way is referred to as bidirectional servo track writer (STW). In an example explained in this embodiment, a disk in which servo information is written from the inner cylinder in the first servo writing processing and servo information is written from the outer cylinder in the second servo writing processing is used. However, the present invention is not limited to this example. A disk in which servo information can be written from the outer cylinder in the first servo writing processing and servo information is written from the inner cylinder in the second servo writing processing can also be used.

As a specific example, the storage device receives and holds a storage medium subjected to first servo writing processing for writing servo information with a mark pattern "I" from a Gray code "11000", which is offset by "1000" from a normal Gray code "10000" on the inner side, to a predetermined cylinder between an innermost cylinder and an outermost cylinder as shown in (1) in FIG. 1 and, after the first servo writing processing, subjected to second servo writing processing for writing servo information with a mark pattern "O" from a Gray code "2000" on the outer side to a predetermined cylinder.

Attention is paid to a section near "the predetermined cylinder" where the pieces of servo information written from the inner side and the outer side overlap. Near "the predetermined cylinder", usually, as shown in (2) in FIG. 1, the servo information written from the inner side and the servo information written from the outer side overlap each other without causing Gray codes thereof to overlap.

The storage device that receives and holds such a recording medium designates a mark pattern and a Gray code such as a Gray code "5001" of a mark pattern "O" and a Gray code "6010" of a mark pattern "I" and controls a position of the head.

In this way, the storage device according to the first embodiment can designate a mark pattern and cylinder information and control the head with respect to a storage medium in which double cylinder occurs, i.e., servo information having two Gray codes with the same value is present in an identical cylinder. As a result, as indicated by the main characteristic, even in a storage medium in which servo information is written by using the bidirectional STW, it is possible to correctly control a position of the head without deteriorating a servo quality.

For example, when an environmental change or a disturbance of the STW, which writes servo information, occurs or when a stopper on the inner side comes off and servo information is written further from the inner side than expected, as shown in (3) in FIG. 1, the double cylinder occurs. In this example, Gray codes "5000" to "5007" are doubly present in an identical cylinder. In such a case, in seeking the head to the Gray code "5001", the head is sought to "5001" of the mark pattern "O" when the head is present on the outer side and is sought to "5001" of the mark pattern "I" when the head is present on the inner side. As a result, data is written and read in different places.

Different mark patterns are used on the inner side and the outer side to write servo information and the mark patterns are also used for seek of the head. Then, even if the head is sought to the Gray code "5001", it is possible to distinguish the seek in the case of the mark pattern "O" and the seek in the case of the mark pattern "I". Therefore, even in a storage medium in which servo information is written by using the bidirectional STW, it is possible to correctly control a position of the head without deteriorating a servo quality.

Figure 2:
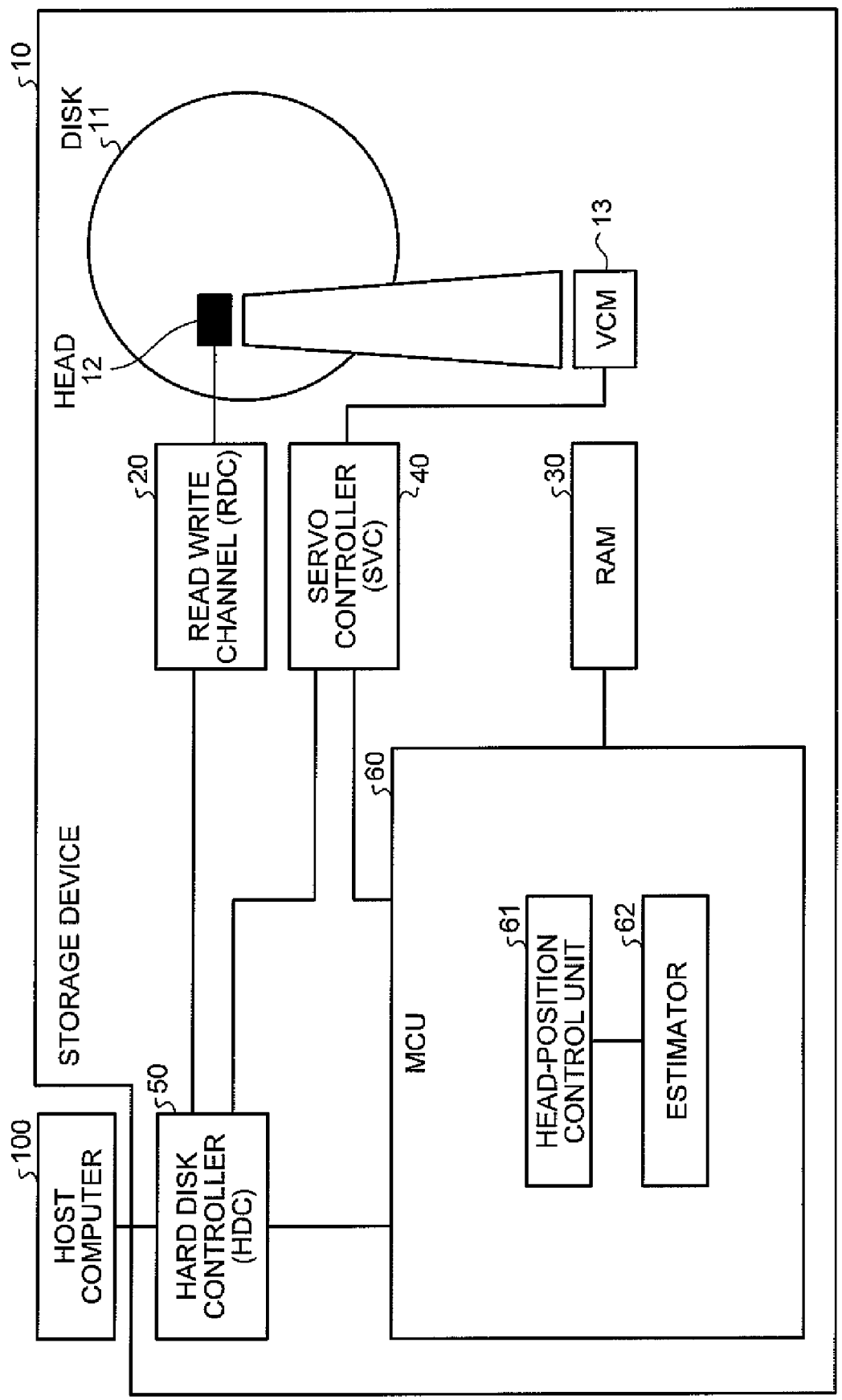
FIG. 2 is a block diagram of the structure of the storage device according to the first embodiment.

FIG. 2 is a block diagram of the structure of the storage device according to the first embodiment shown in FIG. 1. As shown in FIG. 2, a storage device 10 includes a disk 11, a head 12, a voice control motor (VCM) 13, a read write channel (RDC) 20, a random access memory (RAM) 30, a servo controller (SVC) 40, a hard disk controller (HDC) 50, and a micro control unit (MCU) 60.

The disk 11 is subjected to first servo writing processing for writing servo information, a Gray code of which is offset, from an inner cylinder to a predetermined cylinder on an outer side and, after the first servo writing processing, subjected to second servo writing processing for writing servo information from an outer cylinder to a predetermined cylinder on an inner side. The disk 11 records the pieces of servo information with different mark patterns written to overlap near the predetermined cylinders in the first servo writing processing and the second servo writing processing, respectively, and user data. In the first servo writing processing, servo information can be written from the outer cylinder to the predetermined cylinder. In the second servo writing processing, servo information can be written from the inner cylinder to the predetermined cylinder. In the above explanation, the Gray code is offset in the first servo writing processing. However, the Gray code can be offset in the second servo writing processing. In the explanation of this embodiment, an inner most cylinder is a Gray code "10000 Track" and an outermost cylinder is a Gray code "1000 Track".

Specifically, the disk 11 is a disc in which a magnetic film is formed on a disc-like substrate of metal or glass and is a medium on which user data and servo information are magnetically recorded. The disk 11 is a storage medium subjected to first servo writing processing for writing servo information with a mark pattern "I" from a Gray code "11000" offset by "1000" from the normal Gray code "10000" on an inner side to a predetermined cylinder and, after the first servo writing processing, subjected to second servo writing processing for writing servo information with a mark pattern "O" from the Gray code "2000" on an outer side to a predetermined cylinder.

Figure 3:
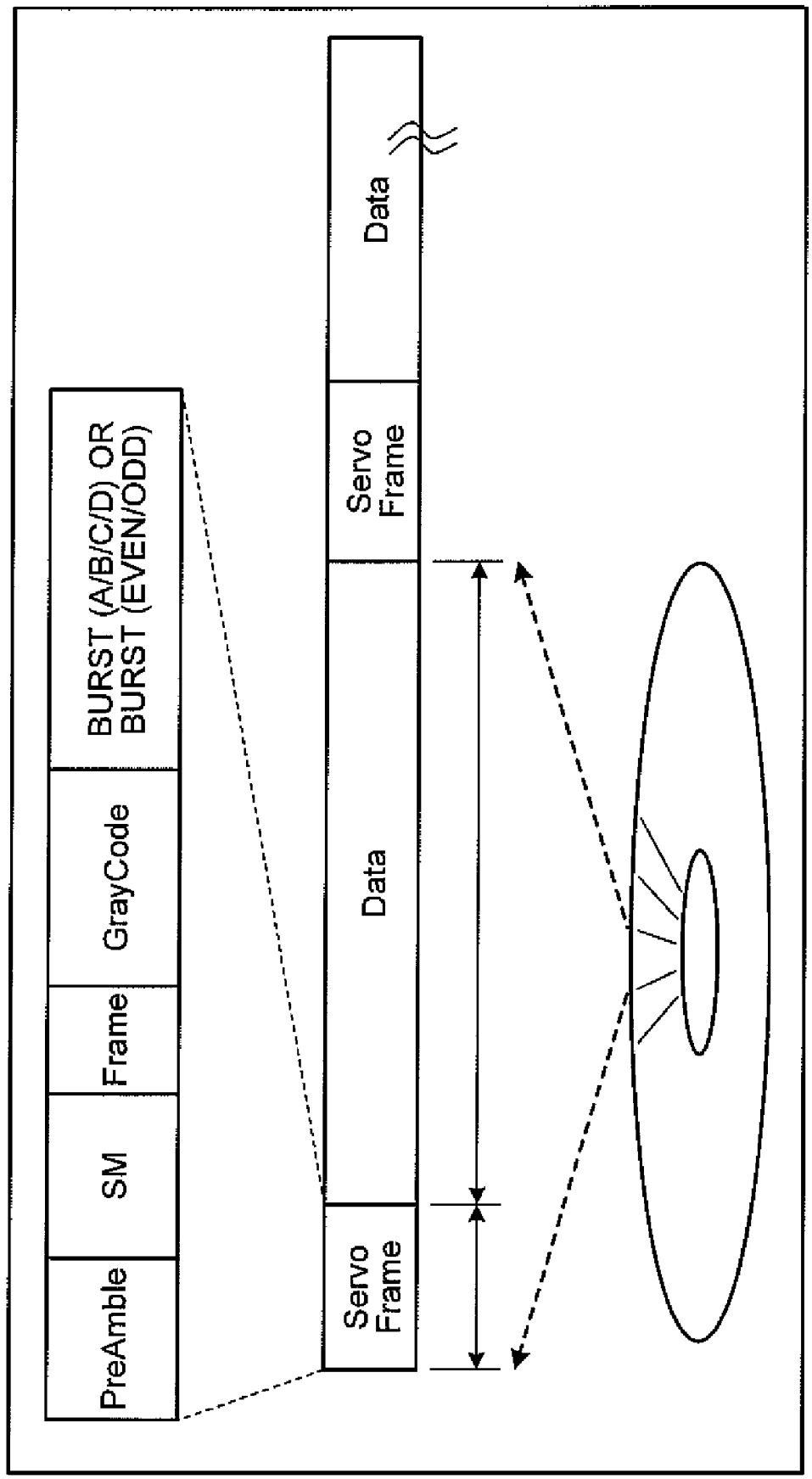
FIG. 3 is a diagram of an example of servo information written in a storage medium.

For example, as shown in FIG. 3, the disk 11 stores, as servo information, "ServoFrame" including "PreAmble, SM, Frame, Graycode, and burst information". The user data means data used for processing in a host computer 100. The servo information means data used for positioning control for the head 12. Data (the user data and the servo information) recorded in the disk 11 is read and the data (the user data) is written in the disk 11 by the head 12. FIG. 3 is a diagram of an example of servo information written in the disk 11.

The head 12 reads data from and writes data in the disk 11 and reads servo information stored in the disk 11. Specifically, the head 12 is formed of elements that convert magnetism into an electric signal. The head 12 reads data from and writes data in the disk 11 and reads servo information from the disk 11 while floating over the rotating disk 11. For example, the head 12 reads user data and servo information magnetically recorded in the disk 11 and transmits data converted into an electric signal to the RDC 20 via a not-shown head amplifier.

To read and write the user data in a predetermined position on the disk 11, it is necessary to perform positioning control for the head 12 to position the head 12 in the predetermined position on the disk 11. Such positioning control for the head 12 is realized by the VCM 13, the SVC 40, and the MCU 60.

The VCM 13 performs the positioning control for the head 12. Specifically, the VCM 13 is a motor that actuates a disk driving unit for moving the head 12. The VCM 13 rotates to perform the positioning control for the head 12. The VCM 13 is connected to the SVC 40 and controlled by the MCU 60.

The RDC 20 mainly performs code demodulation of the user data and the servo information read from the disk 11 and performs code modulation of the user data written in the disk 11. Specifically, the RDC 20 includes a modulation circuit for writing the user data in the disk 11 and a demodulation circuit for extracting position information in the disk 11 from the servo information.

The RAM 30 temporarily stores data. Specifically, the RAM 30 is a random access memory that is connected to the MCU 60 and temporarily stores data such as the servo information read out from the disk 11.

The SVC 40 mainly controls to drive a not-shown spindle motor (SPM) and the VCM 13. Specifically, the SVC 40 includes a power circuit for driving the spindle motor as a motor for rotating the disk 11 and a power circuit for driving the VCM 13 that performs positioning control for the head 12. The SVC 40 is connected to the spindle motor, the VCM 13, the HDC 50, and the MCU 60. For example, the SVC 40 receives an input of a control value indicating position control information of the head 12 from the MCU 60 and controls the VCM 13 based on this control value.

The HDC 50 mainly performs interface control between the host computer 100 and the storage device 10 and interface control among the respective functional units. Specifically, the HDC 50 includes an error correction circuit for correcting an error of data transferred between the host computer 100 and the storage device 10 and an interface control circuit for controlling an interface between the host computer 100 and the storage device 10 and an interface between the RDC 20 and the MCU 60. The HDC 50 is connected to the host computer 100, the SVC 40, the RDC 20, and the MCU 60.

For example, when the HDC 50 receives a read and write instruction for data from the host computer 100, the HDC 50 transmits the data to the RDC 20 to write the data and transmits the data to the host computer 100. For example, the HDC 50 receives an electric current, which is supplied to the head 12 for position control, from the RDC 20 and outputs the electric current to the MCU 60 described later.

The MCU 60 has an internal memory for storing a program for defining various processing procedures and the like and required data. The MCU 60 mainly performs control of the entire storage device 10 and positioning control for the head 12. In particular, as units closely related to the present invention, the MCU 60 includes a head-position control unit 61 and an estimator 62.

The head-position control unit 61 acquires cylinder information and mark patterns from the servo information written in the disk 11 and controls a position of the head 12 based on the acquired cylinder information and mark patterns. Specifically, in the example described above, the head-position control unit 61 designates mark patterns and Gray codes such as "5001" of the mark pattern "O" and "6010" of the mark pattern "I" and controls a position of the head 12.

In seeking a position of the head 12, when it is judged by the estimator 62 that the head 12 crosses over a predetermined cylinder, the head-position control unit 61 does not perform position control using the servo information written in the disk 11 and controls the position of the head 12 using position information estimated by the estimator 62. Specifically, when the servo information is written in the disk 11, predetermined cylinders are designated in advance. The MCU 60 recognizes that a predetermined cylinder on the outer side and a predetermined cylinder on the inner side are "5007 Track" and "6007 Track", respectively. Therefore, when it is judged by the estimator 62 that the head 12 crosses over "5007 Track" from the outer side or "6007 Track" from the inner side, the head-position control unit 61 does not perform position control using the servo information written in the disk 11 and controls the position of the head 12 using the position information estimated by the estimator 62.

The estimator 62 estimates the position of the head 12 from an electric current supplied to the head 12. Specifically, when the position of the head 12 is controlled by the MCU 60 and the head-position control unit 61, the estimator 62 receives the electric current, which is supplied to the head 12, from the SVC 40 and estimates a present position of the head 12 or a seek state of the head 12 from the received electric current. The estimator 62 outputs estimated information to the MCU 60 and the head-position control unit 61.

Figure 4:
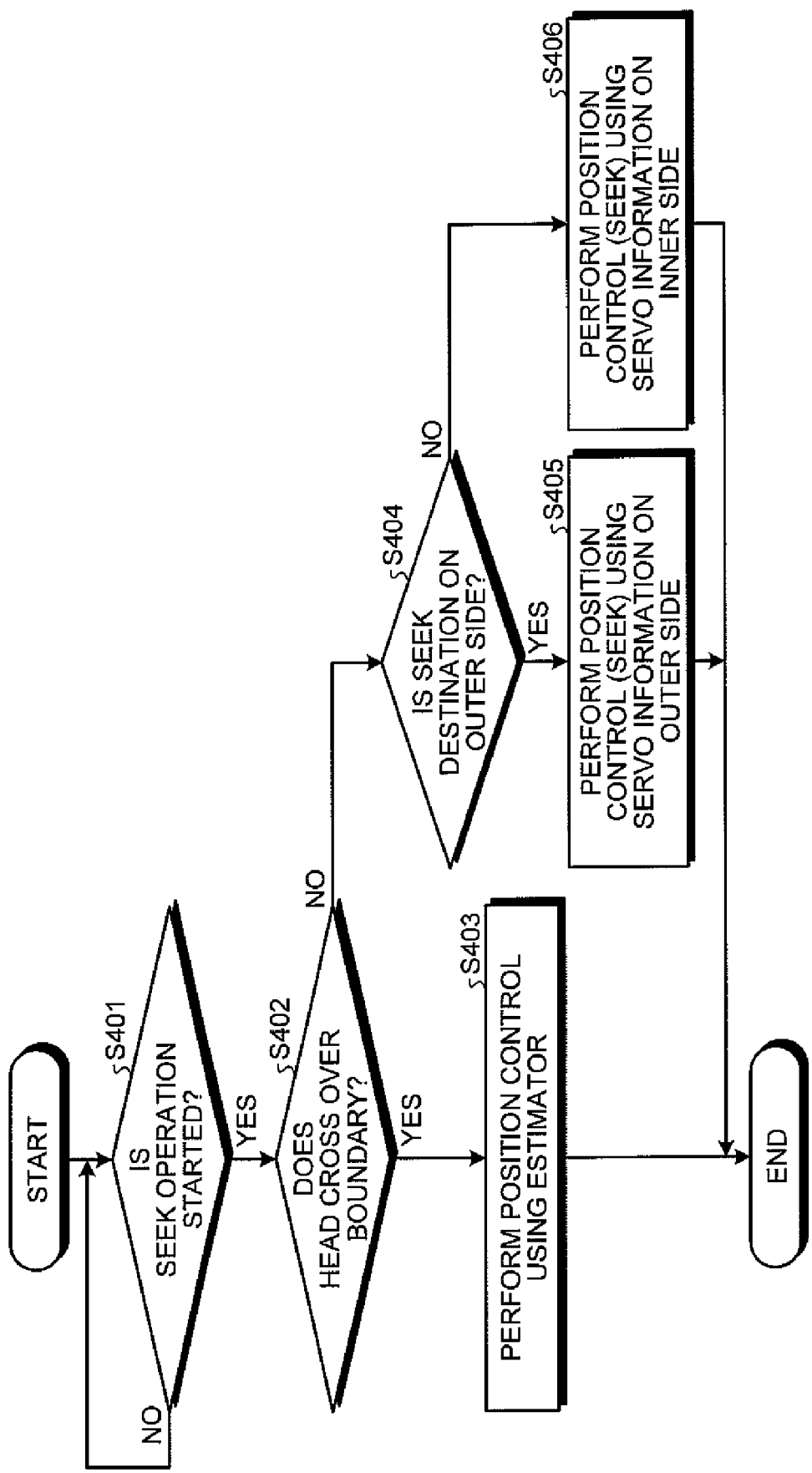
FIG. 4 is a flowchart of a flow of seek processing of a head in the storage device according to the first embodiment.

FIG. 4 is a flowchart of a flow of seek processing for the head in the storage device according to the first embodiment.

As shown in FIG. 4, when a seek operation is started ("Yes" at step S401), the head-position control unit 61 of the storage device 10 judges whether the head 12 crosses over a boundary during the seek (step S402). Specifically, for example, when the head 12 is present on the outer side, the head-position control unit 61 judges whether the head 12 crosses over "5007 Track" and, when the head 12 is present on the inner side, judges whether the head 12 crosses over "6007 Track".

When the head 12 crosses over the boundary during the seek ("Yes" at step S402), the head-position control unit 61 does not perform position control using the servo information written in the disk 11 and seeks a position of the head 12 using position information estimated by the estimator 62 (step S403).

On the other hand, when the head 12 does not cross over the boundary during the seek ("No" at step S402), the head-position control unit 61 judges whether a seek destination is further on the outer side than the boundary (step S404). Specifically, for example, the head-position control unit 61 of the storage device 10 judges whether the seek destination is further on the outer side (e.g., 3000 Track) than the boundary "5007 Track" on the outer side.

When the seek destination is further on the outer side than the boundary ("Yes" at step S404), the head-position control unit 61 of the storage device 10 performs a seek operation for the head 12 based on servo information on the outer side (step S405). Specifically, for example, when the seek destination is further on the outer side than the boundary, the head-position control unit 61 of the storage device 10 performs a seek operation for the head 12 based on the mark pattern "O" and cylinder information (e.g., "5002 Track") on the outer side.

On the other hand, when the seek destination is not further on the outer side than the boundary, i.e., the seek destination is further on the inner side than the boundary ("No" at step S404), the head-position control unit 61 of the storage device 10 performs a seek operation for the head 12 based on the servo information on the inner side (step S406). Specifically, for example, when the seek destination is "6008 Track" further on the inner side than the boundary, the head-position control unit 61 of the storage device 10 performs a seek operation for the head 12 based on the mark pattern "I" and cylinder information (e.g., "7010 Track") on the inner side.

As described above, according to the first embodiment, the disk 11 is subjected to first servo writing processing for writing servo information, a Gray code of which is offset, from the inner cylinder "11000 Track" to the predetermined cylinder "5007 Track" on the outer side and, after the first servo writing processing, subjected to second servo writing processing for writing servo information from the outer cylinder "2000 Track" to the predetermined cylinder "6008 Track" on the inner side. In the disk 11, the pieces of servo information are written to overlap near the predetermined cylinders in the first servo writing processing and the second servo writing processing. The servo information written in the disk 11 is read out by the head 12. A position of the head 12 is controlled by using the read-out servo information. Therefore, even in the disk 11 in which servo information is written by using the bidirectional STW, it is possible to correctly control a position of the head without deteriorating a servo quality. Because a storage medium with a high servo quality can be used, it is possible to contribute to an increase in TPI in future while keeping a seek error rate equivalent to that in the past.

According to the first embodiment, cylinder information and mark patterns are acquired from servo information written in the disk 11 and a position of the head 12 is controlled based on the acquired cylinder information and mark patterns. Therefore, the pieces of servo information having the different mark patterns are written on the outer side and the inner side. As a result, even if double cylinder occurs, it is possible to judge likelihood of cylinders and perform position control for the head 12 with respect to the servo information on the outer side. It is possible to accurately carry out writing and readout of data.

According to the first embodiment, in seeking a position of the head 12, when it is judged by the estimator 62 that the head 12 crosses over the predetermined cylinder ("5007 Track" or "6008 Track"), position control is not performed by using the servo information written in the disk 11 and the position of the head 12 is controlled by using position information estimated by the estimator 62. Therefore, near the predetermined cylinders as boundaries, even if servo marks and Gray codes are found by chance, burst information is uncertain and an electric current for controlling the head 12 is disturbed. Consequently, when the head 12 crosses over the predetermined cylinder as the boundary, it is possible to prevent misdetection of servo information near the predetermined cylinder as the boundary by controlling the position of the head 12 using a head position estimating function used in a general magnetic disk device.

In the present invention, it is also possible that predetermined cylinders are set near a yaw angle 0 degree and the disk 11 in which pieces of servo information are written in the first servo writing processing and the second servo writing processing, respectively, is held.

Therefore, in a second embodiment of the present invention, the disk 11 is subjected to first servo writing processing for writing servo information, a Gray code of which is offset, from an inner cylinder to a cylinder near a yaw angle 0 degree on an outer side and, after the first servo writing processing, subjected to second servo writing processing for writing servo information from an outer cylinder to a cylinder near a yaw angle 0 degree on an inner side. In the disk 11, the pieces of servo information are written to overlap near the cylinders near the yaw angle 0 degree in the first servo writing processing and the second servo writing processing.

Figure 5:
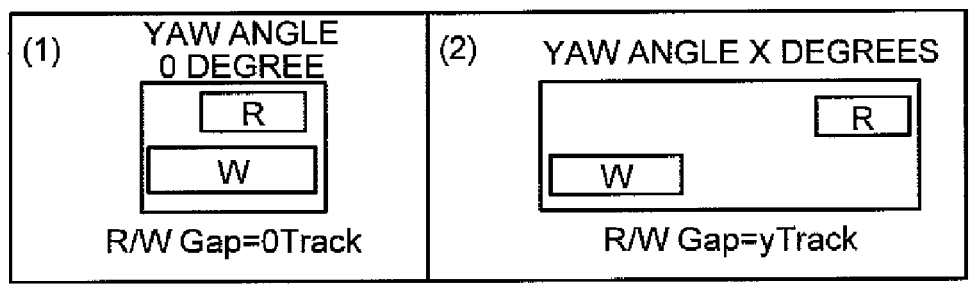
FIG. 5 is a diagram for explaining R/WGap near a yaw angle of 0 degree.

FIG. 5 is a diagram for explaining R/WGap near the yaw angle 0 degree. As shown in (1) in FIG. 5, concerning the cylinders with the yaw angle 0 degree, because read and write are performed in the same cylinder, there are few useless tracks (R/WGap=0). However, as shown in (2) in FIG. 5, concerning cylinders with angles other than the yaw angle 0 degree, because the number of cylinders not used for read and write increases, there are many useless tracks (R/WGap=yTrack).

Figure 6:
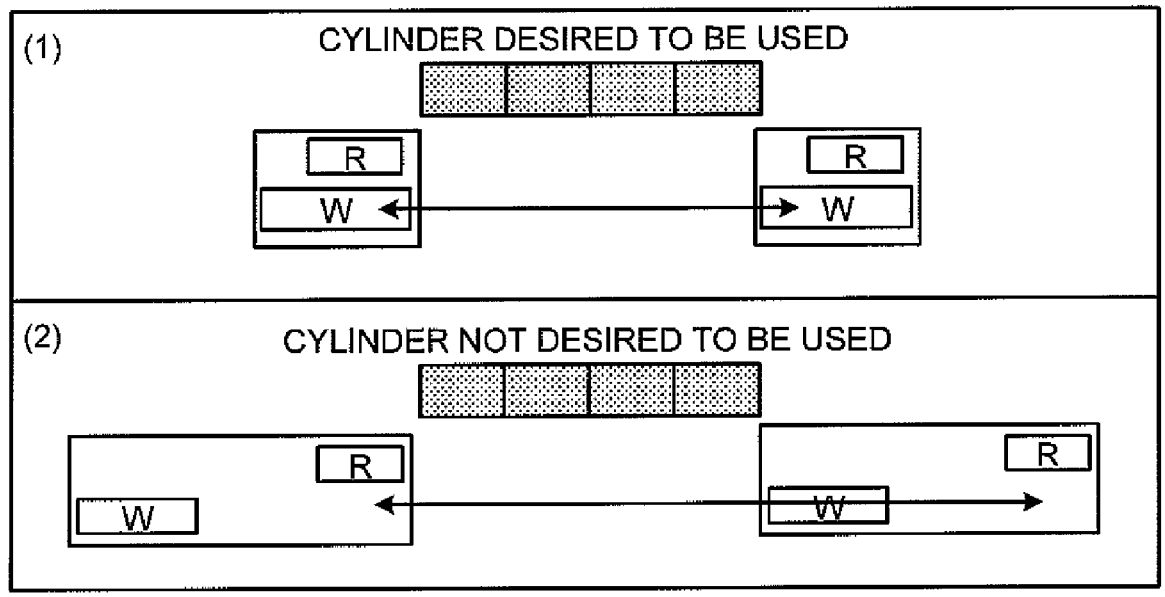
FIG. 6 is a diagram for explaining an unused area in R/WGap.

Near the boundaries (near the yaw angle 0 degree), it is highly likely that a servo mark mistake and misdetection, misdetection of a Gray code, and misdetection of burst information occur. Therefore, the storage device 10 registers, as unused areas, areas near the yaw angle 0 degree in a management area such as a system area of the storage medium and controls the head 12 to track-skip the boundaries. For example, when a range of fluctuation due to vibration is set to ±2 Gray codes and the number of cylinders not desired to be used is set to four, as shown in (1) in FIG. 6, in the case of the areas near the yaw angle 0 degree, because a difference of R/WGap is minimized, areas that should be unused are also minimized. On the other hand, as shown in (2) in FIG. 6, in the case of angles other than the yaw angle 0 degree, because the difference of R/WGap increases, the areas that should be unused also increase. FIG. 6 is a diagram for explaining unused areas in R/WGap.

As described above, according to the second embodiment, the areas near the yaw angle 0 degree are set as unused areas and the head 12 is controlled to track-skip the boundaries. Therefore, it is possible to prevent a position of the head 12 from becoming unstable because of a servo mark mistake and misdetection that occur when a read core is present in the boundaries, misdetection of a Gray code, and misdetection of burst information.

In the example explained in the first embodiment, during seek of the head, when it is judged from position information estimated by the estimator that the head crosses over the predetermined cylinder (the boundary), even if servo information from a medium detected from a servo mark is obtained, a position of the head is controlled by using position information estimated by the estimator. However, the present invention is not limited to this. Assuming a worse case, timing for detecting servo information can be changed to timing narrower than that during a normal operation to control the position of the head.

Figure 7:
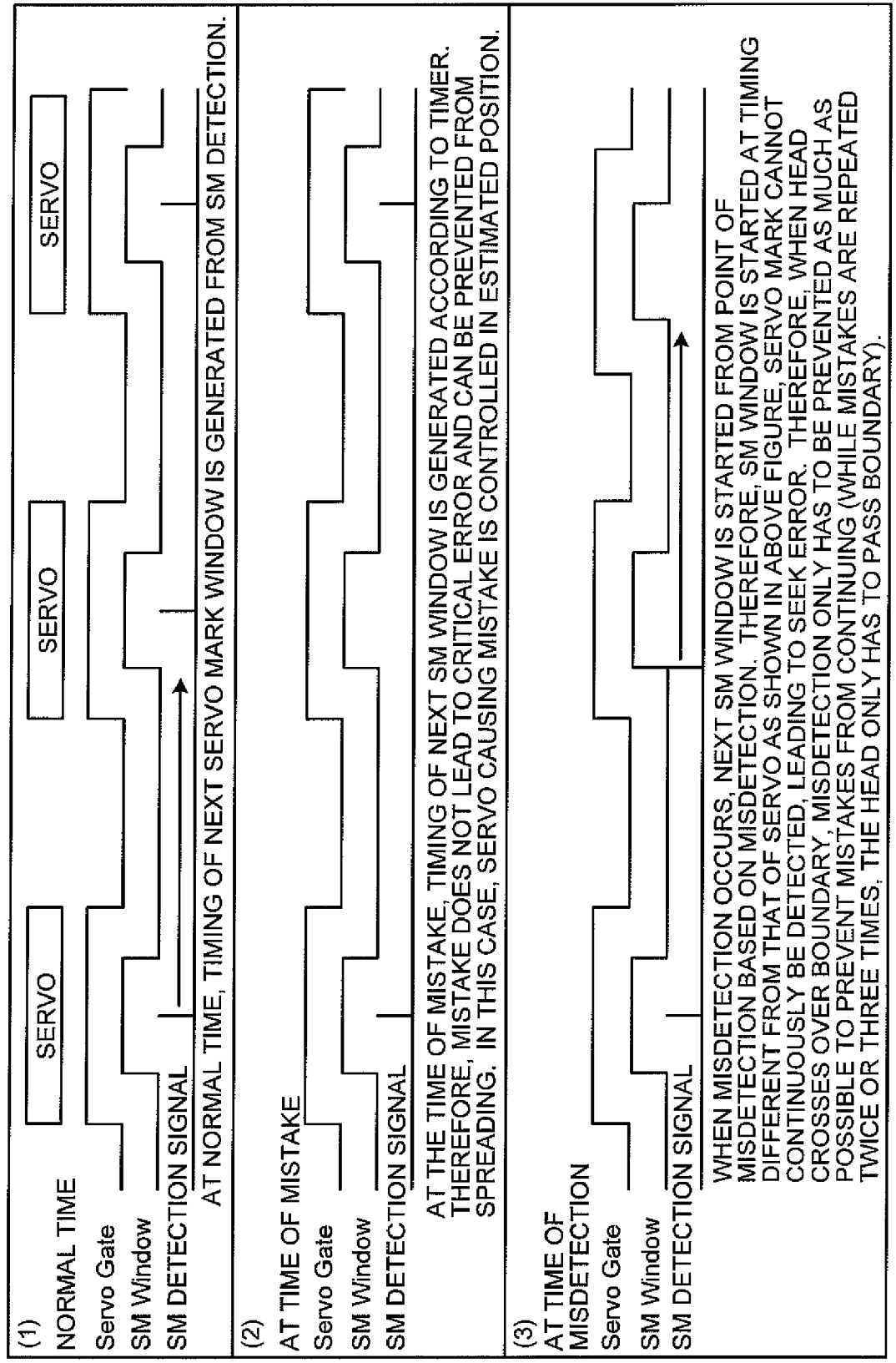
FIG. 7 is a diagram of a relation between servo information and a servo mark window.

Therefore, in a third embodiment of the present invention, for example, during seek of the head, when it is judged from position information estimated by the estimator that the head crosses over the boundary, timing for detecting servo information is changed to narrow timing to control a position of the head. FIG. 7 is a diagram of a relation between servo information and a Servo Mark Window. The Servo Mark Window indicates a servo mark detectable range. When a result of read (demodulation) by the RDC is within the range, detection is regarded as normal. In other words, the Servo Mark Window is a Window that guarantees that the HDC and servo synchronize with each other.

As shown in (1) in FIG. 7, when servo information (a servo mark: SM) is normally detected at correct timing, a timer is reset and the MCU 60 generates timing of the next Servo Mark Window (SMW) from SM detection. A detection range of the next servo information is determined by the SMW. The RDC 20 reads servo information at timing of a Servo Gate and outputs read information to the HDC 50. The HDC 50 compares the output information with the Servo Mark Window and, when the information is within the range of the Window, regards the detection as normal and outputs the information to the MCU 60. In this way, the MCU 60 can detect the servo information.

At the time of a detection mistake of servo information, as shown in (2) in FIG. 7, after the mistake occurs, the timer is reset at timing when the servo information should be detected and the MCU 60 generates the next SMW. Therefore, the detection mistake does not lead to a critical error and can be prevented from spreading. In this case, the servo information is controlled in an estimated position.

However, when servo information is misdetected, as shown in (3) in FIG. 7, the MCU 60 starts the next SMW from a point of the misdetection based on the misdetection. Therefore, the SMW is started at timing different from that of servo on a medium and a servo mark cannot be detected. Moreover, because the next servo is still off the reset timing of the timer, a servo mark cannot continuously be detected, leading to a seek error. Therefore, when the head crosses over a boundary where misdetection highly likely occurs because servo information is written to be shifted in a radial direction and a time direction, it is necessary to prevent misdetection as much as possible to prevent mistakes from continuing. In other words, while mistakes are repeated twice or three times, the head only has to pass the boundary.

Figure 8:
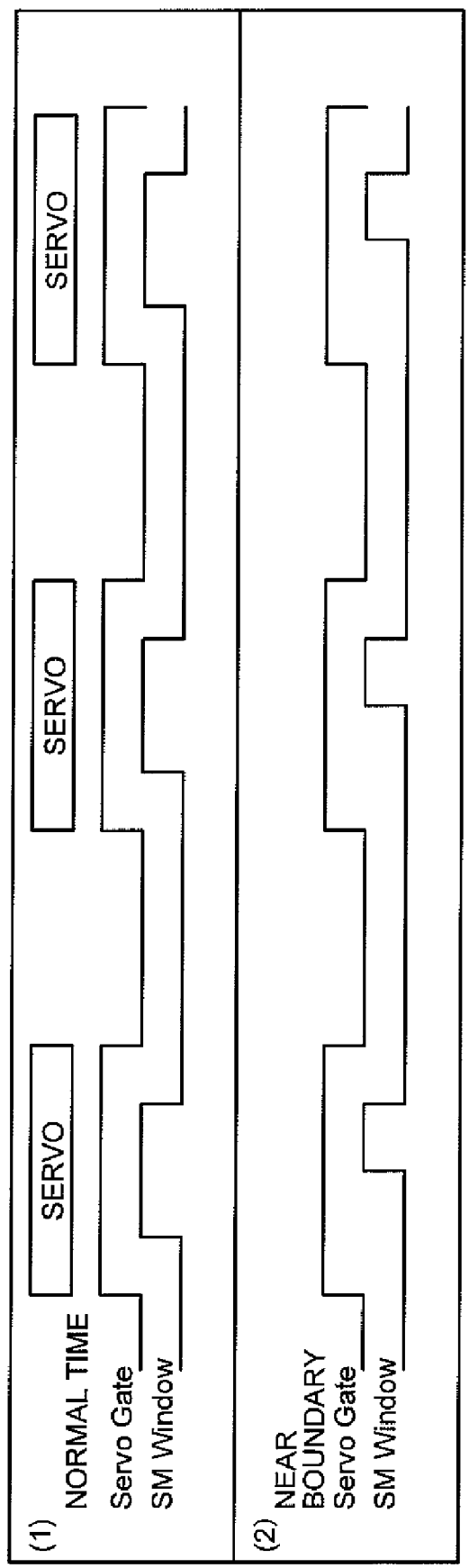
FIG. 8 is a diagram of an example in which timing for starting an SMW is narrowed.

Specifically, when servo information is written at timing shown in (1) in FIG. 8, during normal time, the MCU 60 starts the SMW at timing shown in (2) in FIG. 8. When the head crosses over a boundary where misdetection highly likely occurs, the MCU 60 can perform control to prevent mistakes from continuously occurring by narrowing the timing for starting the SMW. As a method of further preventing misdetection, it is also effective to set an ExtMode (an extended mode) as a misdetection prevention enhanced mode for adding Preamble for several bits immediately before a servo mark to a normal servo mark pattern (about 10 bits) and recognizing the servo mark pattern as a servo mark. FIG. 8 is a diagram of an example in which timing for starting the SMW is narrowed.

Figure 9:
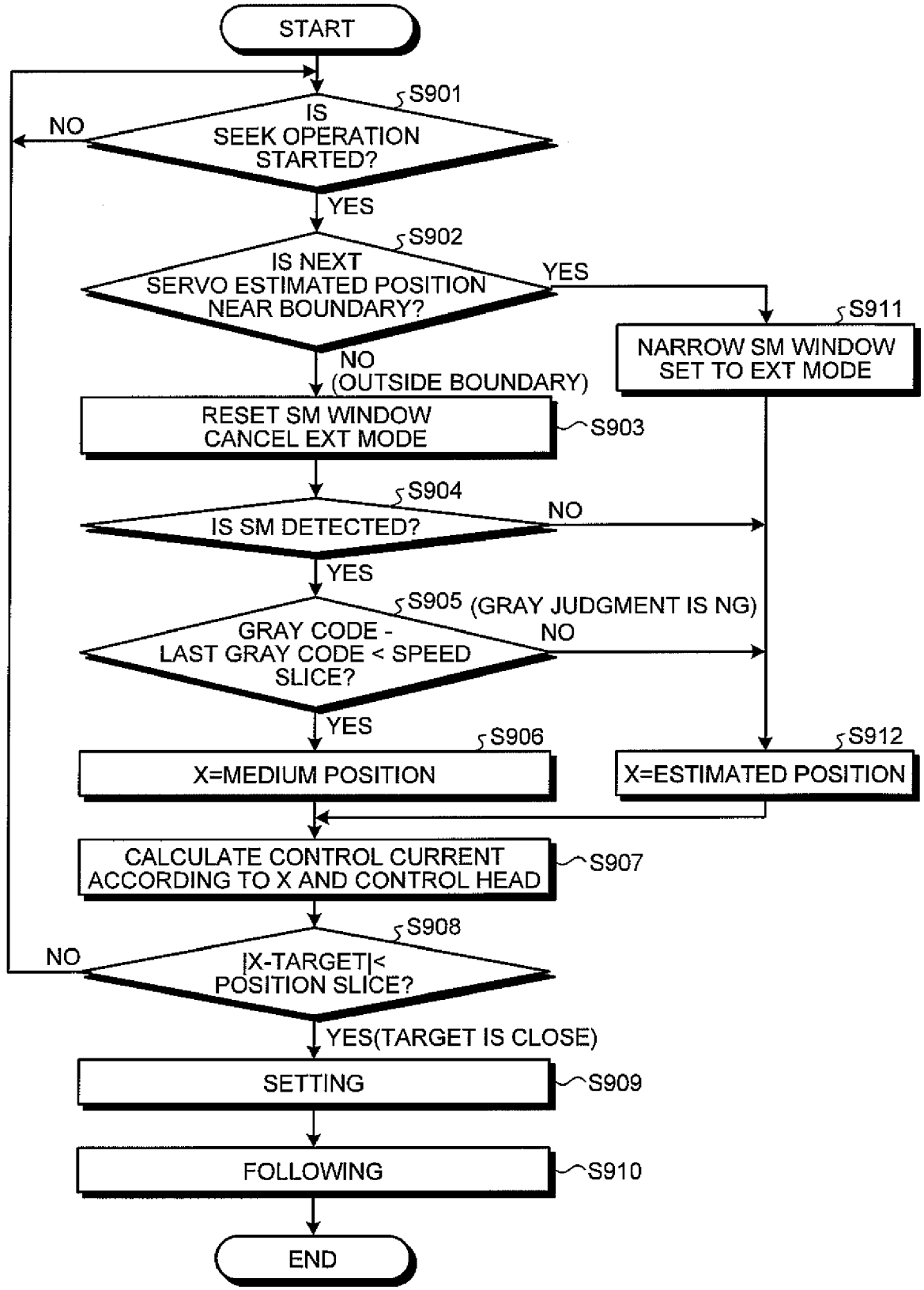
FIG. 9 is a flowchart for explaining a flow of seek processing in a storage device according to a third embodiment of the present invention.

FIG. 9 is a flowchart for explaining a flow of seek processing in the storage device 10 according to the third embodiment.

As shown in FIG. 9, when a seek operation is started ("Yes" at step S901), the MCU 60 of the storage device 10 judges, for each servo until the head 12 moves to a seek destination, whether an estimated position of the next servo is within several tracks from the boundary (near the boundary) using the estimator 62 (step S902).

When the estimated position of the next servo is not near the boundary ("No" at step S902), the MCU 60 resets the SM Window and cancels the Ext Mode (step S903) and performs SM detection (step S904).

When servo information (SM) is detected ("Yes" at step S904), the MCU 60 of the storage device 10 judges whether a difference between a Gray code of the detected servo information (SM) and a Gray code of servo information detected last time is smaller than a speed Slice (step S905).

When the difference between the Gray code of the detected servo information (SM) and the Gray code of the servo information detected last time is smaller than the speed Slice ("Yes" at step S905), the MCU 60 of the storage device 10 specifies a media position (specifies a media position as X) and calculates a control current according to the specified media position and controls the head 12 (steps S906 and S907).

Thereafter, when an absolute value of the specified media position is smaller than a position Slice, i.e., when it is judged that a seek destination (target) is close to the media position ("Yes" at step S908), the MCU 60 of the storage device 10 performs setting and following to seek the head 12 to the specified media position (steps S909 and S910).

On the other hand, when an absolute value of the specified media position is larger than the position Slice, i.e., when it is judged that the seek destination (target) is far from the media position ("No" at step S908), the MCU 60 of the storage device 10 returns to step S901. The MCU 60 repeats the processing to bring the media position closer to the target.

When the estimated position of the next servo is near the boundary, i.e., when it is highly likely that the head 12 crosses over the boundary ("Yes" at step S902), the MCU 60 narrows the SM Window and sets the Ext Mode (step S911), sets the estimated position as a media position (X) (step S912), and executes the processing at step S907 and the subsequent steps.

As described above, according to the third embodiment, in seeking a position of the head 12, when it is judged by the estimator 62 that the head 12 crosses over the predetermined cylinder (the boundary), the Servo Mark Window as the timing for detecting servo information written in the disk 11 is changed to narrow timing to control the position of the head 12. Therefore, it is possible to prevent servo information near the boundary from being misdetected.

In the example explained in the third embodiment, when it is judged that the head crosses over the predetermined cylinder (the boundary) during the seek of the head, timing for detecting servo information is changed to narrow timing to control a position of the head. However, the present invention is not limited to this. When the head crosses over the boundary because of head change or the like, it is also possible to feed a micro current to the head and for forcibly move the head from the boundary.

Figure 10:
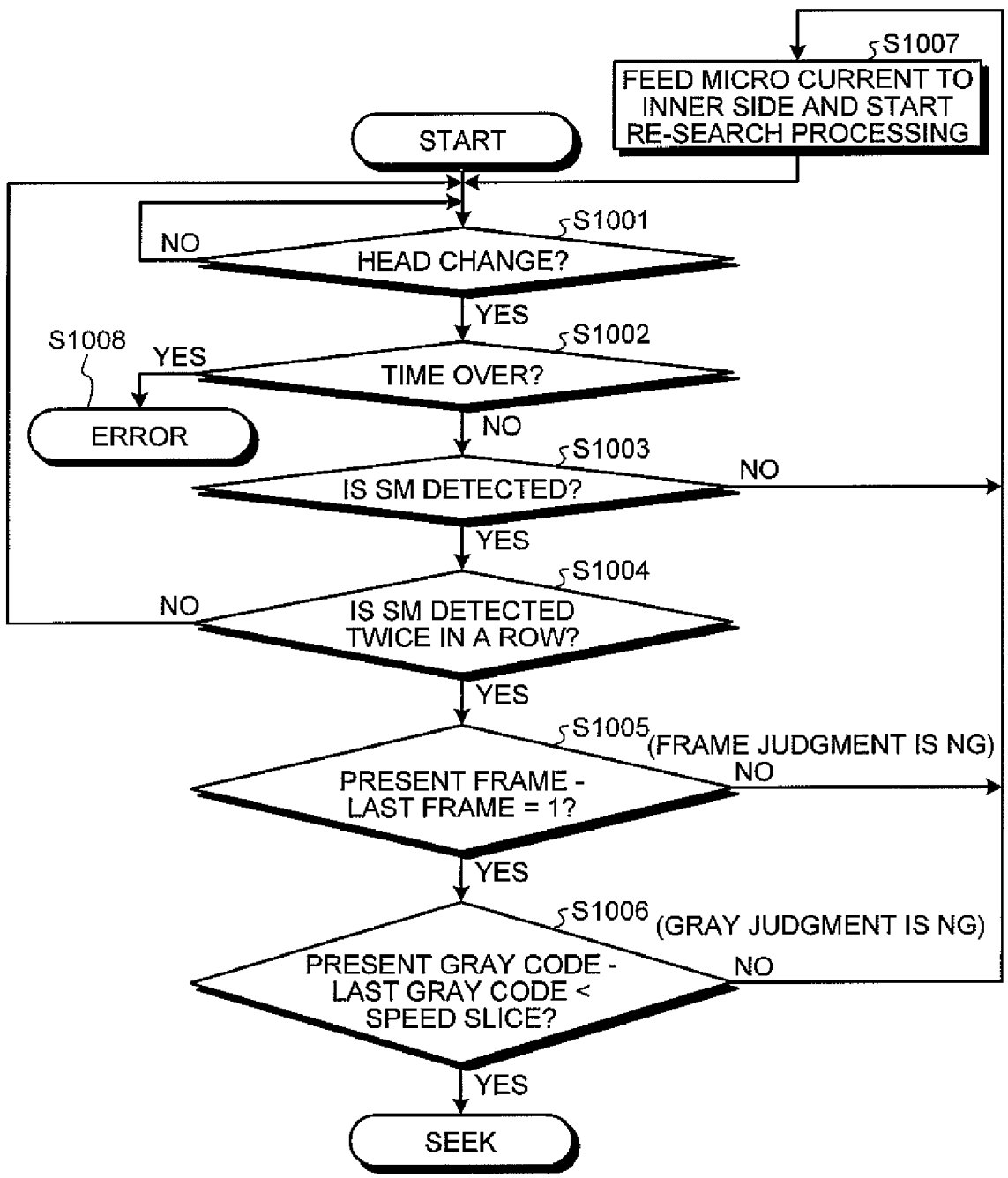
FIG. 10 is a flowchart of a flow of control of a head in head change.
Figure 11:
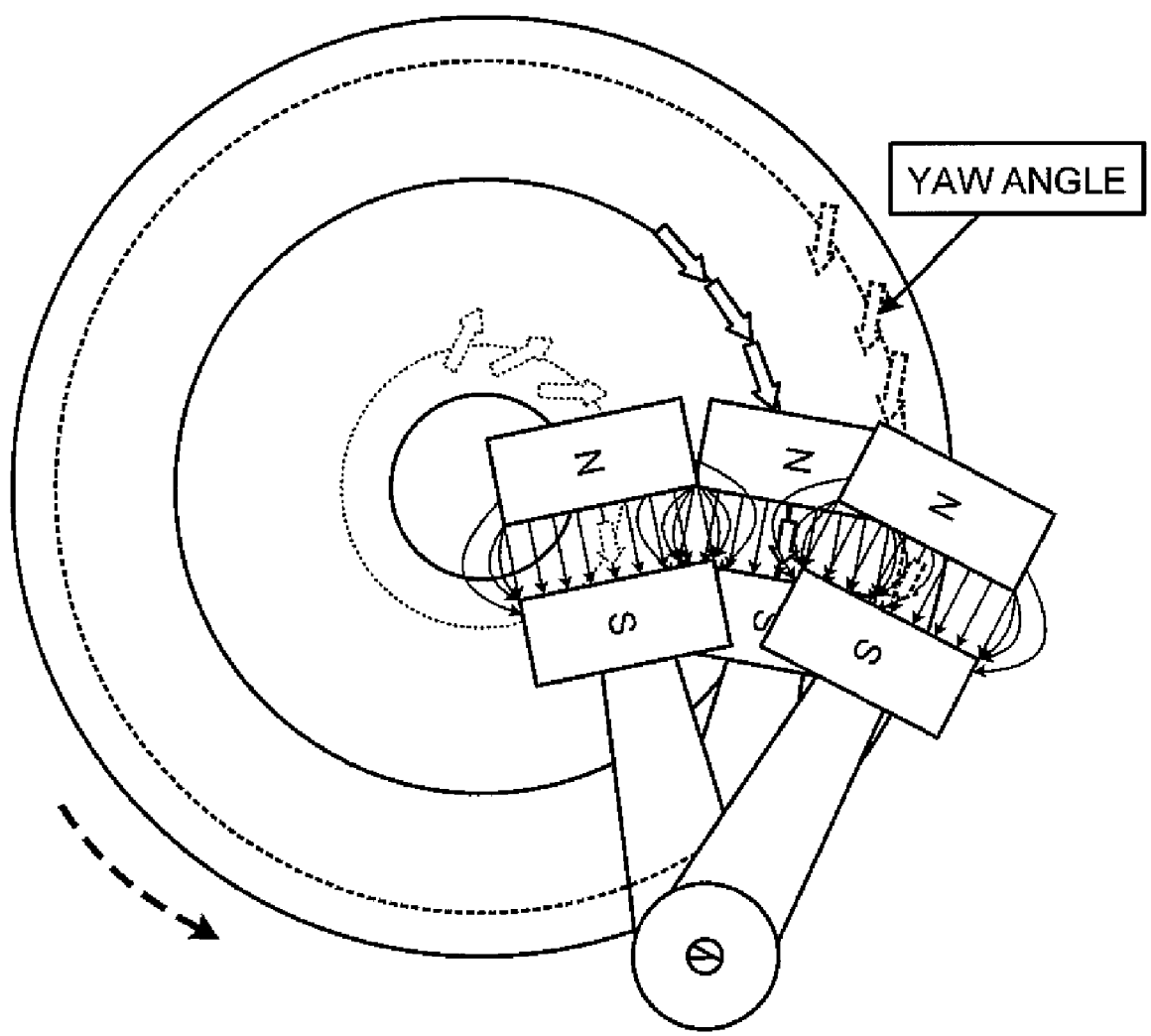
FIG. 11 is a diagram of a relation between a yaw angle and a feeding direction of an STW.
Figure 12A:
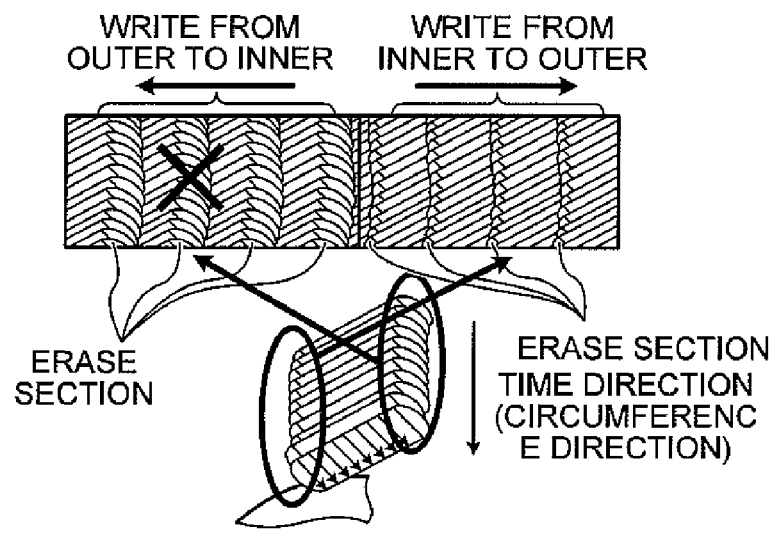
FIGS. 12A to 12C are diagrams for explaining erase portions in the feeding direction of the STW.
Figure 12B:
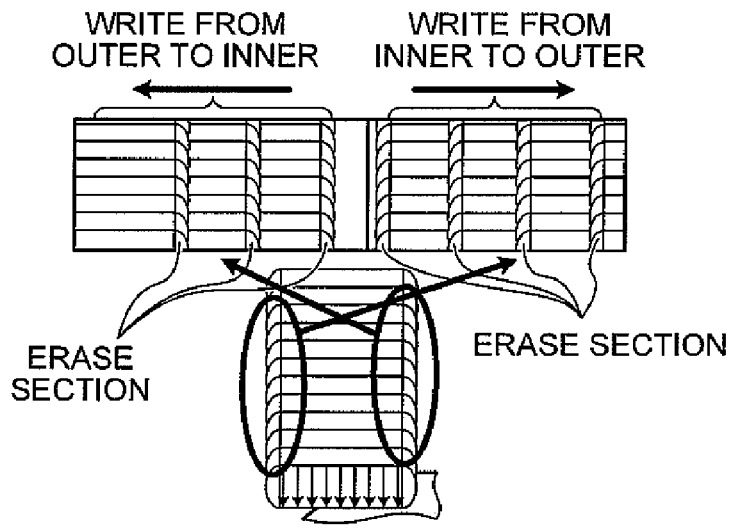
Figure 12C:
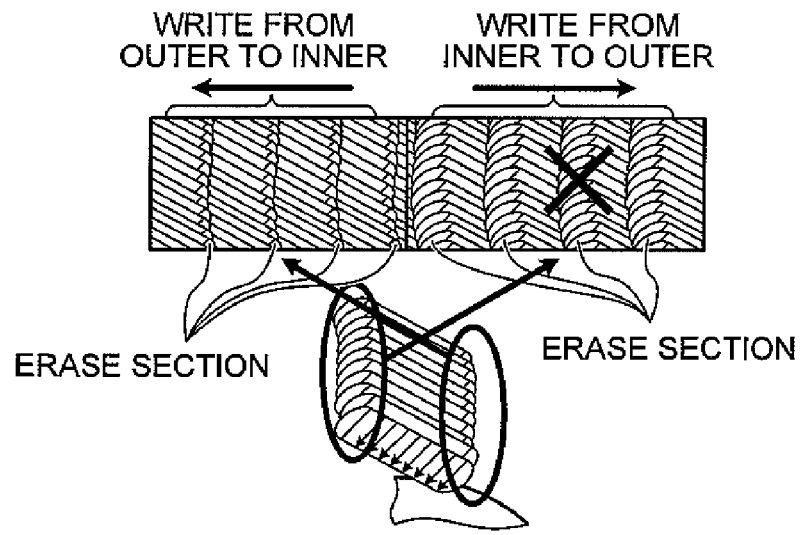

FIG. 10 is a flowchart of a flow of control of the head in head change in a fourth embodiment of the present invention.

In the fourth embodiment, to judge earlier whether the head is present in the boundary, servo information with a special frame pattern of the boundary (e.g., a frame pattern not usually used such as an FF) is written. Whereas a value incremented for each servo should be usually read, the value is prevented from being read in the boundary by using the special frame pattern. In this way, boundary judgment is added to the head change.

As shown in FIG. 10, when head change is performed ("Yes" at step S1001), the MCU 60 of the storage device 10 judges whether time over has occurred (step S1002).

When time over has not occurred ("No" at step S1002) and SM is detected ("Yes" at step S1003), the MCU 60 judges whether SM is detected twice in a row (step S1004).

When SM is detected twice in a row ("Yes" at step S1004), a difference between the present frame and the last frame is "1" ("Yes" at step S1005), and a difference between the present Gray code and the last Gray code is smaller than speed Slice ("Yes" at step S1006), the MCU 60 starts a seek operation.

On the other hand, when SM is continuously detected ("Yes" at step S1004) and the difference between the present frame and the last frame is not "1" ("No" at step S1005) or when the difference between the present Gray code and the last Gray code is larger then the speed Slice ("No" at step S1006), the MCU 60 feeds a micro current to the inner side with respect to the head 12 and starts re-search processing (step S1007).

When SM is not continuously detected ("No" at step S1004), the MCU 60 returns to step S1001 and carries out the processing at step S1001 and the subsequent steps. When time over has occurred in step S1002 ("Yes" at step S1002), the MCU 60 detects an error and finishes the processing (step S1008).

As described above, according to the fourth embodiment, near the predetermined cylinder as the boundary, servo information having a frame number of a special pattern that cannot be detected is written. This makes it possible to prevent misdetection of the servo information near the predetermined cylinder as the boundary and position control for the head 12 due to the misdetection. In particular, between media, it is unknown where the head 12 meets a boundary. Therefore, head change may also overlap the boundary. Even in such a case, when it is judged that an area is a boundary, it is possible to feed a micro current to the inner side and forcibly move the head 12 from the boundary. As a result, it is possible to acquire normal servo information (position information) and prevent head change from resulting in an error.

The embodiments of the present invention have been explained. However, the present invention can be carried out in various different forms besides the embodiments described above. Different embodiments are explained below as the storage device 10 according to the first embodiment.

The respective components of the respective devices shown in the figures are functionally conceptual and are not always required to be physically configured as shown in the figures. In the embodiments, the method realized by a firmware program of a CPU is explained. However, the present invention is not limited to this method. The present invention can also be applied to methods realized by other configurations. In other words, specific forms of distribution and integration of the devices are not limited to those shown in the figures (e.g., FIG. 2). It is possible to configure all or a part of the devices to be functionally or physically distributed and integrated in an arbitrary unit according to various loads, states of use, and the like (e.g., the head-position control unit 61 and the estimator 62 can be integrated). Moreover, all or an arbitrary part of the various processing functions performed in the respective devices can be realized by an MCU (or a processing device such as a CPU or an MPU) and programs analyzed and executed by the MCU (or the processing device such as the CPU or the MPU) or can be realized as hardware according to the wired logic.

It is possible to realize the head position control method explained in the embodiments by executing the method in a micro control unit in a disk device as a computer. It is possible to distribute these programs through a network such as the Internet. It is possible to execute the programs by recording the programs in computer-readable recording media such as a hard disk, a flexible disk (FD), a compact disc-read only memory (CD-ROM), a magneto-optical disk (MO), and a digital versatile disc (DVD) and reading out the programs from the recording media using the computer.

As described above, the storage device and the servo information writing method according to the present invention are useful for reading servo information written in an inserted and held storage medium using the head and controlling a position of the head using the read servo information. In particular, the storage device and the servo information writing method are suitable for correctly controlling a position of the head without deteriorating a servo quality even in a storage medium in which servo information is written by using the bidirectional STW.

According to the embodiment of the present invention, even in a storage medium in which servo information is written by using the bidirectional STW, it is possible to correctly control a position of the head without deteriorating a servo quality. Because a storage medium with a high servo quality can be used, it is possible to contribute to an increase in TPI in future while keeping a seek error rate equivalent to that in the past.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A storage device comprising:
a storage medium that is subjected to first servo writing processing for writing servo information from one of an inner cylinder and an outer cylinder to a predetermined cylinder and, after the first servo writing processing, subjected to second servo writing processing for writing servo information from other one of the inner cylinder and the outer cylinder to the predetermined cylinder, the servo information written in the first servo writing processing and the servo information written in the second servo writing processing being written to overlap each other near the predetermined cylinder in the first servo writing processing and the second servo writing processing;
a head that reads out the information written in the storage medium; and
a head-position control unit that reads out the servo information written in the storage medium using the head and controls a position of the head using the read-out servo information,
wherein the servo information written in the first servo writing processing and the servo information written in the second servo writing processing have different mark patterns and
the head-position control unit acquires cylinder information and the mark patterns from the servo information written in the storage medium and controls the position of the head based on the acquired cylinder information and mark patterns.

2. The storage device according to claim 1, wherein
the predetermined cylinder is set near a yaw angle 0 degree, and
the head-position control unit controls, with an area near the yaw angle 0 degree as an unused area, the head to track-skip the boundary.

3. A storage device comprising:
a storage medium that is subjected to first servo writing processing for writing servo information from one of an inner cylinder and an outer cylinder to a predetermined cylinder and, after the first servo writing processing, subjected to second servo writing processing for writing servo information from other one of the inner cylinder and the outer cylinder to the predetermined cylinder, the servo information written in the first servo writing processing and the servo information written in the second servo writing processing being written to overlap each other near the predetermined cylinder in the first servo writing processing and the second servo writing processing;
a head that reads out the information written in the storage medium;
a head-position control unit that reads out the servo information written in the storage medium using the head and controls a position of the head using the read-out servo information; and
an estimator that estimates a position of the head from an electric current supplied to the head,
wherein in seeking the position of the head, when the estimator determines that the head crosses over the predetermined cylinder, the head-position control unit changes timing for detecting the servo information written in the storage medium to narrow timing and controls the position of the head.

4. The storage device according to claim 3, wherein the servo information written in the first servo writing processing and the servo information written in the second servo writing processing each has frame numbers of special patterns near the predetermined cylinder.

5. A storage device comprising:
a storage medium that is subjected to first servo writing processing for writing servo information from one of an inner cylinder and an outer cylinder to a predetermined cylinder and, after the first servo writing processing, subjected to second servo writing processing for writing servo information from other one of the inner cylinder and the outer cylinder to the predetermined cylinder, the servo information written in the first servo writing processing and the servo information written in the second servo writing processing being written to overlap each other near the predetermined cylinder in the first servo writing processing and the second servo writing processing;
a head that reads out the information written in the storage medium;
a head-position control unit that reads out the servo information written in the storage medium using the head and controls a position of the head using the read-out servo information; and
an estimator that estimates a position of the head from an electric current supplied to the head,
wherein in seeking the position of the head, when the estimator determines that the head crosses over the predetermined cylinder, the head-position control unit controls the position of the head using position information estimated by the estimator, without performing position control using the servo information written in the storage medium.

6. A servo information writing method comprising:
performing, on a storage medium, first servo writing processing for writing servo information from one of an inner cylinder and an outer cylinder to a predetermined cylinder; and after the first servo writing processing, performing, on the storage medium, second servo writing processing for writing servo information from other one of the inner cylinder and the outer cylinder to the predetermined cylinder, the servo information written in the first servo writing processing and the servo information written in the second servo writing processing being written to overlap each other near the predetermined cylinder in the first servo writing processing and the second servo writing processing wherein the servo information written in the first servo writing processing and the servo information written in the second servo writing processing have different mark patterns.

7. The servo information writing method according to claim 6, wherein the predetermined cylinder is set near a yaw angle 0 degree.

8. The servo information writing method according to claim 6, wherein the servo information written in the first servo writing processing and the servo information written in the second servo writing processing each has frame numbers of special patterns near the predetermined cylinder.

9. A servo information writing device comprising:

a servo writing unit that writes servo information from any one of an inner cylinder and an outer cylinder to a predetermined cylinder, and writes servo information in a storage medium, in which the servo information is written, from other one of the inner cylinder and the outer cylinder, to the predetermined cylinder, wherein the servo information written from the one of the inner cylinder and the outer cylinder and the servo information written from the other one of the inner cylinder and the outer cylinder have different mark patterns.

10. The servo information writing device according to claim 9, wherein the servo writing unit writes the servo information from any one of the inner cylinder and the outer cylinder to a predetermined cylinder near a yaw angle 0 degree, and writes the servo information in the storage medium, in which the servo information is written, from other one of the inner cylinder and the outer cylinder, to the predetermined cylinder near the yaw angle 0 degree.

11. The servo information writing device according to claim 9, wherein the servo information written from the one of the inner cylinder and the outer cylinder and the servo information written from the other one of the inner cylinder and the outer cylinder each has frame numbers of special patterns near the predetermined cylinder in the storage medium.

* * * * *